Patented Oct. 7, 1924.

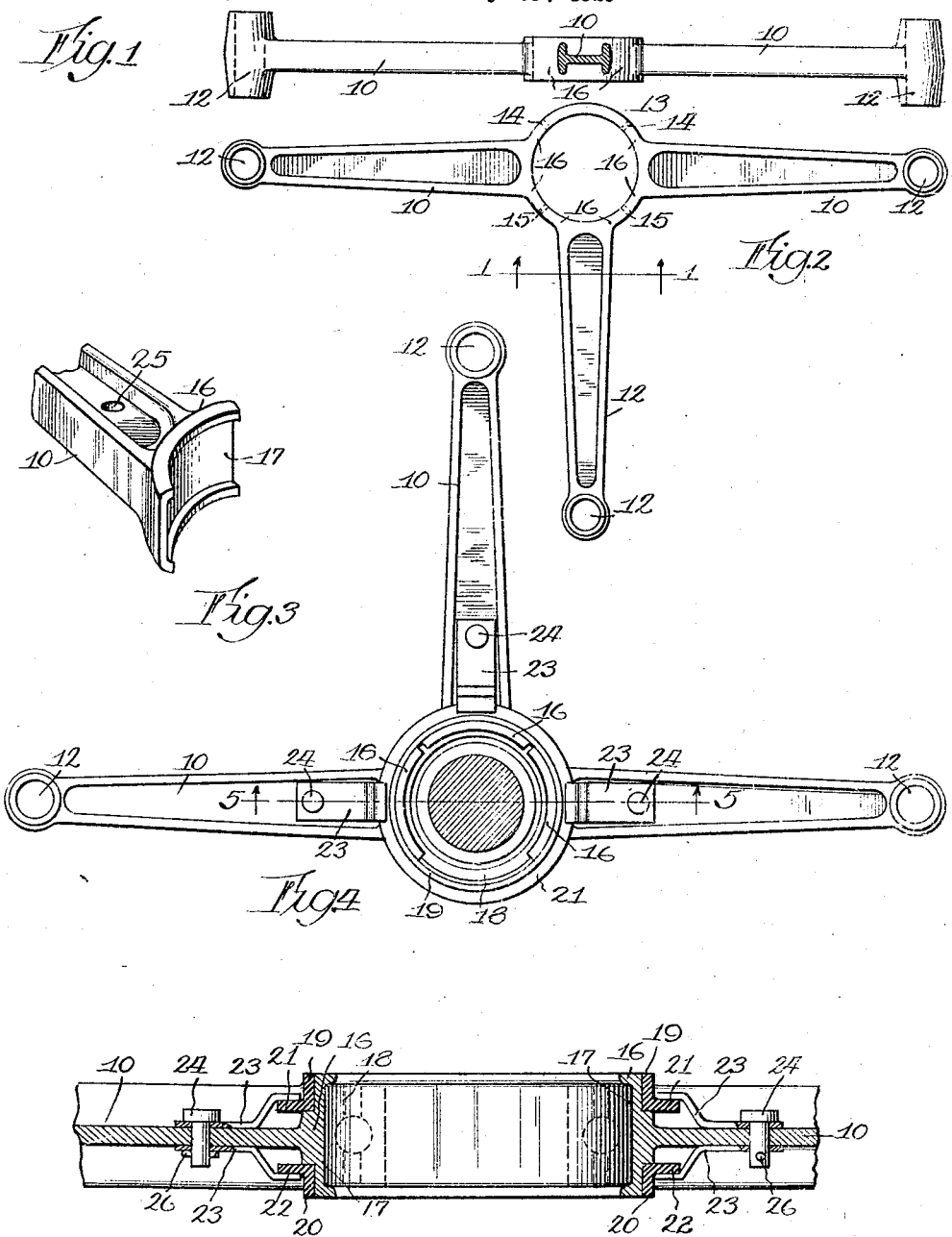

1,510,685

UNITED STATES PATENT OFFICE.

GUY L. KLUEFER, OF CHICAGO, ILLINOIS, ASSIGNOR TO RICHARD J. COYNE, WILLIAM M. RETTIG, W. W. KLORE, AND N. ROGERS BARR, AS TRUSTEES FOR MULTI-X AIRCRAFT & MOTORS COMPANY, OF CHICAGO, ILLINOIS, A CORPORATION OF DELAWARE.

PISTON ROD.

Application filed May 26, 1921. Serial No. 472,814.

*To all whom it may concern:*

Be it known that I, GUY L. KLUEFER, a citizen of the United States, residing at Chicago, in the county of Cook and State of Illinois, have invented certain new and useful Improvements in Piston Rods, of which the following is a specification.

This invention relates to improvements in piston rods, and one of the objects of the invention is to form a plurality of rods as an integral structure, thereby necessitating but one machining operation for the central bearing of all of the rods, with the result that there will be a perfect alinement of the wrist pin bearings, insuring a uniform stroke on all of the piston rods.

A further object is to provide an improved construction of piston rods for an engine of the type embodying a plurality of rods connected with a common crank and by means of which construction the employment of a master piston rod will be obviated, with the result that the size of the bearing between the rods and the crank as well as the number of parts will be materially reduced.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a sectional view on line 1—1, Figure 2.

Figure 2 is a plan view showing the manner in which the rods are initially formed.

Figure 3 is a detail perspective view of the inner end of one of the rods.

Figure 4 is a top plan view of the rods assembled about the bearing.

Figure 5 is a sectional view taken on line 5—5, Figure 4.

As shown in the drawing, the numeral 10 designates a plurality of piston rods which are formed as an integral structure to provide a bearing opening 11 at the inner ends of the rods and wrist pin bearings 12 at the free ends of the rods.

These rods 10 may be of any desired size and configuration and may be formed integrally in any suitable manner by casting or otherwise so as to produce the central opening, after which, the central opening is machined while the rods are connected so that the inner bearing ends of the rods 10 will be simultaneously shaped.

After the machining operation, and in the event that three of the rods are formed integrally, the portion 13 of the inner bearing is removed by cutting the wall of the bearing opening as at 14 and the rods 10 are then severed from each other by making similar cuts 15 through the wall of the central bearing opening and intermediate adjacent rods.

These cuts 14 and 15 may be formed at any desired point but are preferably formed on angles of 45° with relation to the respective rods so as to produce extended laterally projecting bearing portions 16 at the inner ends of each of the rods. These portions 16, as shown more clearly in detail in Figure 3, are of a segmental shape and are preferably of a channel construction to provide an opening 17 for the reception of a bearing 18 of the roller type.

This bearing 18 is connected with the crank shaft of an engine in the usual manner, after which the piston rods 10 are assembled by placing the inner ends 16 adjacent the periphery of the bearing so that the periphery of the bearing will enter the channel portion 17 of the segmental extensions 16.

The piston rods and bearings are secured together in any suitable manner preferably by means of annular elements 19—20, which are placed over the ends of the portions 16 on opposite sides of the respective piston rods and the annular elements are provided with flanges 21—22 which are adapted to be engaged by suitable clips 23, the latter being secured to the respective piston rods 10 in any suitable manner preferably by means of a fastening bolt 24 passing through a suitable aperture 25 in the piston rod and also through openings in the clips 23. The bolt 24 may be removably secured in position in any suitable manner such as by means of a cotter pin 26 passing through a suitable opening therein.

The laterally projecting segmental portion 16 of the piston rods 10 are of such a length that the rods 10 will have a rocking movement about the bearing 18 independently with respect to each other when the crank is rotated with the result that there will be a uniform stroke on all of the rods. With this improved construction it will be manifest that the use of a master piston rod will be obviated and with this construction it will also be seen that one machining operation is all that is necessary for the inner bearing ends of the piston rods.

While in the present invention there have been shown three piston rods formed integrally it is of course to be understood that this number may be varied, according to the number of rods that it is desired to form.

What is claimed as new is:—

In combination a plurality of piston rods each provided with a channel bearing segment adjacent the inner end thereof, a bearing proper adapted to fit into the said segments when the latter are assembled, the walls of the segments overhanging the said bearing, said segments operating independently upon the said bearing, annular elements encompassing portions of the segments and on opposite sides of the piston rods, and clips detachably connected with the piston rods and engaging the said annular elements for holding the latter in position and with respect to which elements the rods are freely movable independently with respect to each other.

In testimony whereof I have signed my name to this specification, on this 17th day of May, A. D. 1921.

GUY L. KLUEFER.